(12) United States Patent
Saito et al.

(10) Patent No.: US 6,431,921 B2
(45) Date of Patent: Aug. 13, 2002

(54) BATTERY CONNECTION PLATE HAVING BUSBAR AND TERMINAL

(75) Inventors: Satoshi Saito; Tomohiro Ikeda, both of Shizuoka (JP)

(73) Assignee: Yazaki Corp., Tokyo (JP)

( * ) Notice: Subject to any disclaimer, the term of this patent is extended or adjusted under 35 U.S.C. 154(b) by 0 days.

(21) Appl. No.: 09/901,685

(22) Filed: Jul. 11, 2001

Related U.S. Application Data (62) Division of application No. 09/572,252, filed on May 17, 2000, now Pat. No. 6,290,552.

(30) Foreign Application Priority Data

May 18, 1999 (JP) .......................................... 11-136959

(51) Int. Cl.[7] .............................................. H01R 13/405
(52) U.S. Cl. ..................................... 439/736; 439/801
(58) Field of Search .................................. 439/736, 388, 439/578, 424, 801, 722

(56) References Cited

U.S. PATENT DOCUMENTS

| | | | |
|---|---|---|---|
| 3,354,422 A | | 11/1967 | Duris ........................... 439/801 |
| 3,742,432 A | * | 6/1973 | Curtis et al. ................. 439/736 |
| 4,049,335 A | | 9/1977 | Julian et al. ................. 439/892 |
| 4,114,976 A | | 9/1978 | Selvin et al. ................ 439/736 |
| 4,118,097 A | | 10/1978 | Budnick ....................... 439/736 |
| 4,602,830 A | * | 7/1986 | Lockard ....................... 439/736 |
| 4,602,831 A | * | 7/1986 | Lockard ....................... 439/736 |
| 5,409,404 A | | 4/1995 | Reed ............................ 439/736 |
| 5,711,067 A | | 1/1998 | Jenner et al. ................ 439/736 |
| 6,086,413 A | * | 7/2000 | Karasik et al. ............. 439/736 |

FOREIGN PATENT DOCUMENTS

| | | |
|---|---|---|
| GB | 2 330 251 A | 4/1999 |
| JP | 1-101108 | 7/1989 |
| JP | 4-114715 | 10/1992 |
| WO | WO 98 11615 A | 3/1998 |

* cited by examiner

*Primary Examiner*—Brian Sircus
*Assistant Examiner*—Hae Moon Hyeon
(74) *Attorney, Agent, or Firm*—Armstrong, Westerman & Hattori, LLP (57) ABSTRACT

A battery connection plate is provided. A terminal and a busbar are insert-molded in a plate body. The terminal is screw-connected to an electrode of a battery with a nut. The terminal is provided with a hole portion and a projecting portion having an opening communicating with the hold portion, and the opening faces in the screwing direction of the nut. The plate body is provided with a pin portion and projections are arranged on both sides of the pin portion, and the terminal is provided with a through hole for the pin portion. The projections are positioned adjacently to both sides of the terminal, and the terminal is secured to the plate body by melting the pin portion and the projections. The terminal body is formed integrally with the busbar with use of a metal sheet, and the busbar is formed by double-folding back the metal sheet. The terminal body may be connected to the busbar through a narrow portion. The plate body is provided with a pair of guide walls having respective slit-like insertion-fixing portions to receive the electric wire connected to the terminal, and a groove portion for arranging the electric wires is formed between the guide walls.

3 Claims, 10 Drawing Sheets

BATTERY CONNECTION PLATE HAVING BUSBAR AND TERMINAL

This application is a divisional of prior application Ser. No. 09/572, 252 filed May 17, 2000, now U. S. Pat. No. 6, 290, 552.

BACKGROUND OF THE INVENTION

1. Field of the Invention

The present invention generally relates to a battery connection plate and more particularly to a battery connection plate and a manufacturing method therefor wherein a busbar for connecting batteries in series and a terminal for voltage detection are insert-molded in a plate body made of synthetic resin.

2. Description of the Related Art

Figure 11:
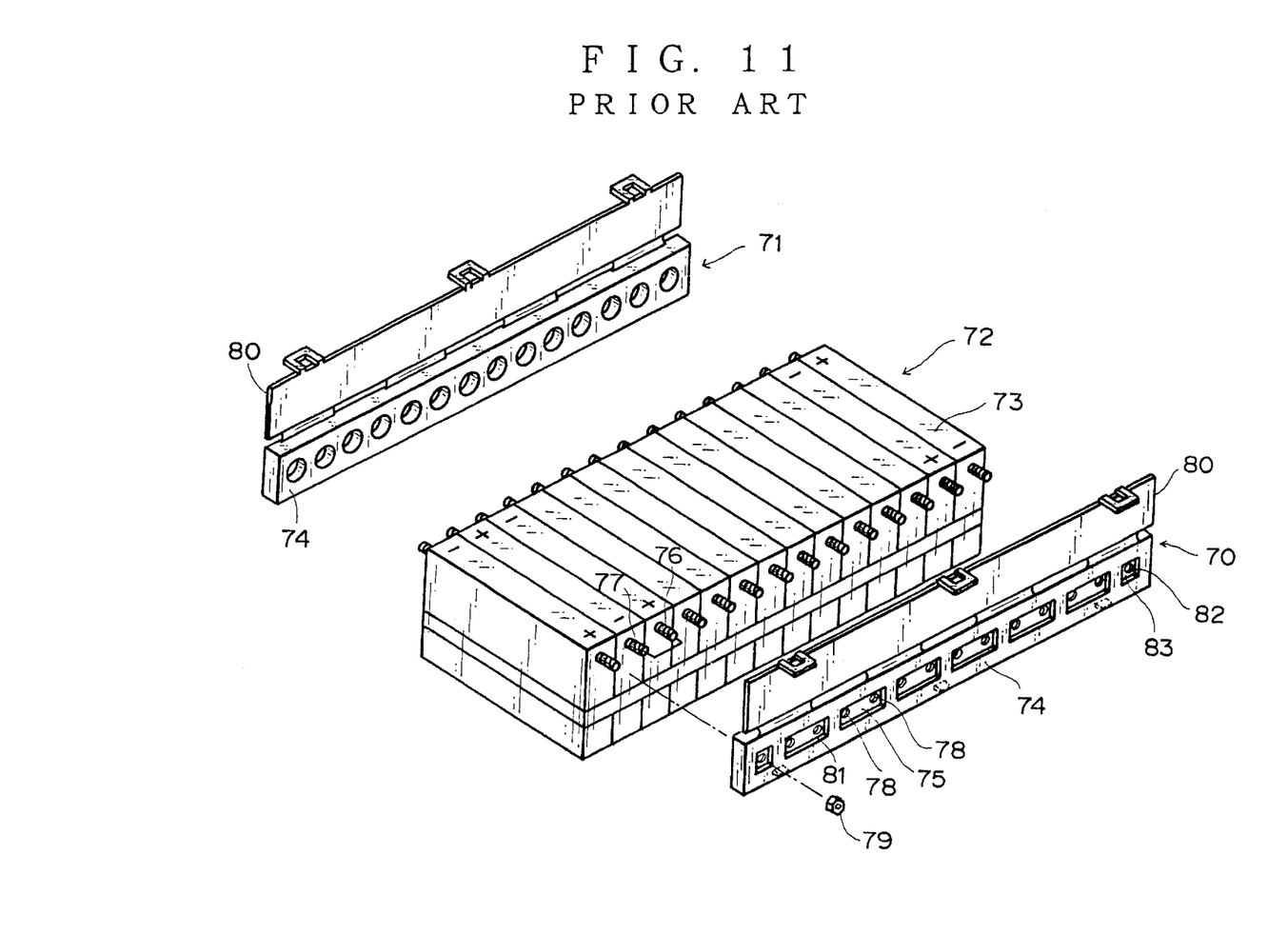
FIG. 11 is an exploded perspective view showing an example of a conventional battery connection plate.

FIG. 11 shows a conventional battery connection plate.

Battery connection plates 70, 71 are provided at both ends of a battery set 72 and connect batteries 73 in series, which battery connection plates 70, 71 have a plurality of conductive metal busbars 75 in parallel on an oblong plate body 74 made of synthetic resin.

The busbar 75 has a pair of through holes 78 for connecting electrodes 76, 77, each having a male thread, of the neighboring two batteries 73 and is fixed to the plate body 74 by means of pressing-insertion, insert-molding, or the like. Each of electrodes 76, 77 is tightly-connected with a nut 79 to the busbar 75.

A busbar 83 having one through hole 82 is fixed to both ends of the battery connection plate 70, and both the electrodes 76, 77 of the battery 73 arranged at the both ends of the battery set 72 are connected through each of busbars 83 to respective power feeders (not illustrated) each having a terminal.

A cover 80 is pivotably provided on the plate body 74, and the busbars 75, 83, electrodes 76, 77 and nuts 79 are protected inside an accommodating portion 81 by closing the cover 80.

Figure 12:
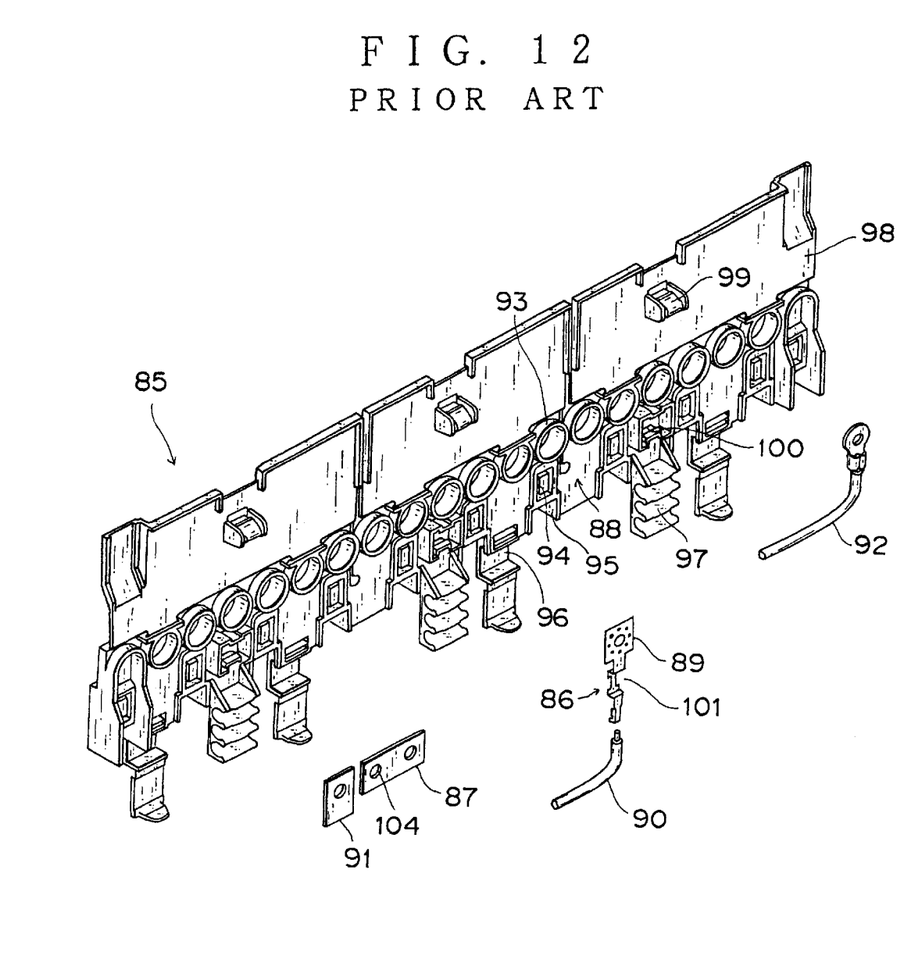
FIG. 12 is an exploded perspective view showing another example of a conventional battery connection plate.

FIG. 12 is an exploded perspective view showing another example of a conventional battery connection plate. In this battery connection plate 85, a terminal 86 for voltage detection is provided on each of two neighboring batteries (not illustrated). The terminal 86 is insert-molded in a plate body 88 made of synthetic resin along with the busbar 87. The busbar 87 is surface-connected to a tabular electrically contacting portion 89 provided at the end of the terminal 86, electronic parts (not illustrated) such as a circuit protection element, e. g. fuse, is soldered to a middle portion 101 of the terminal 86, and a signal line 90 is pressure-welded to a base portion of the terminal 86.

Reference numeral 87 designates a busbar with two holes, 91 designates a busbar with one hole, and 92 designates a power feeder with a terminal. The terminal 86 for voltage detection is arranged inside a front circular hole 93 of the plate body 88 along with the busbar 87. The above electronic parts (not illustrated) at the middle portion 101 of the terminal 86 is arranged inside an intermediate framed portion 94. The signal line 90 bends in a right angle from a framed portion 95 and is laid inside a short groove portion 96. The power feeder 92 is laid inside another short groove portion 97. 98 designates a pivotable cover which is locked to the plate body 88 by locking means 99, 100.

Figure 13:
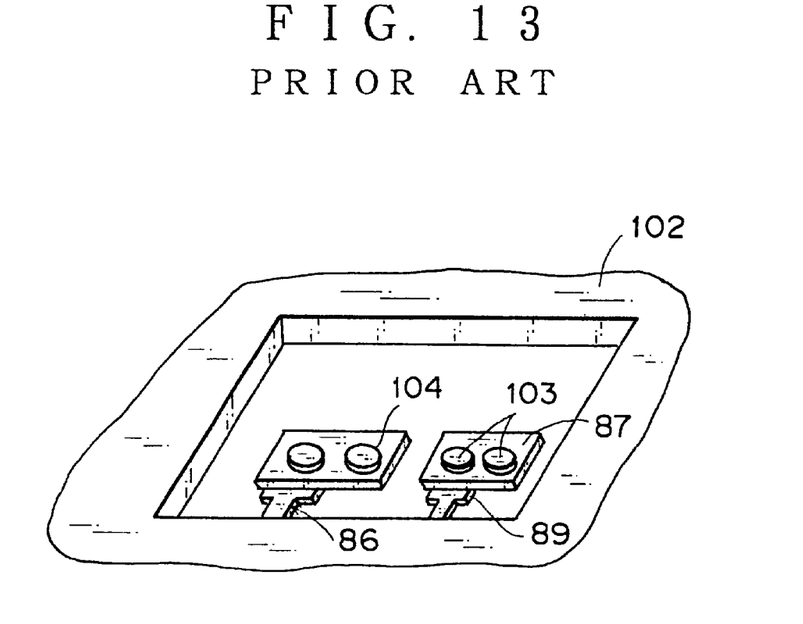
FIG. 13 is a perspective view showing a state before insert-molding the electric terminal and the busbar of FIG. 12.

The insert-molding of the terminal 89 for voltage detection and the busbar 87 is carried out with a metal mold 102 as shown in FIG. 13. For example, melted resin is injected around the busbar 87 and the terminal 89 in a state that each of through holes 104 of the busbar 87 and the terminal 89 engages a boss 103 located in a metal mold 102.

Figure 14:
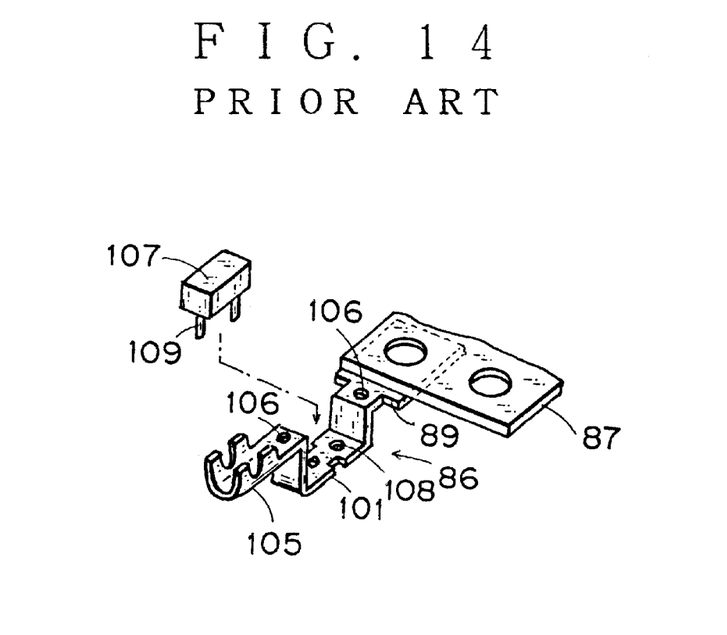
FIG. 14 is an exploded perspective view showing a state of mounting an electronic parts onto the electric terminal of FIG. 12.
Figure 15:
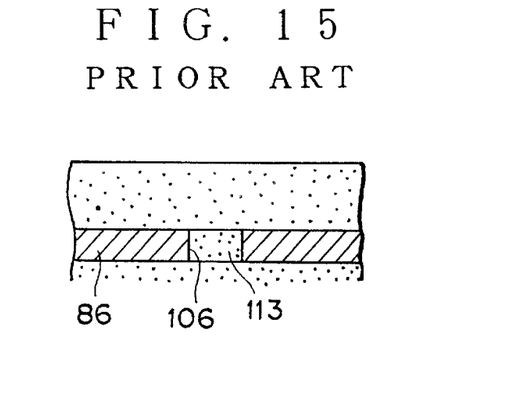
FIG. 15 is a sectional view showing a state of having insert-molded the electric terminal of FIG. 13.

As shown in FIG. 14, a small hole 106 is provided on the electrically contacting portion 89 side and on the wire connecting portion 105 side of the terminal 86 for voltage detection. As show in FIG. 15, resin 113 enters the small holes 106 at the insert-molding, and the terminal 86 is secured. In FIG. 14, a pair of small holes 108 for connecting an electronic parts 107 is provided on the middle portion 101 of the terminal 86, lead terminals 109 of the electronic parts 107 are inserted into the small holes 108 and soldered. In case that the electronic parts 107 is of a circuit protection element, the middle portion 101 of the terminal 86 is cut off between the lead terminals 109. As is shown in FIG. 16, a male-threaded electrode 110 of the battery (not illustrated) is inserted into the through holes 104 of the busbar 87 and the terminal 86 and tightly-connected to the busbar 87 with a nut 111 by means of a tool 112 in an arrow Z1 direction.

Figure 16:
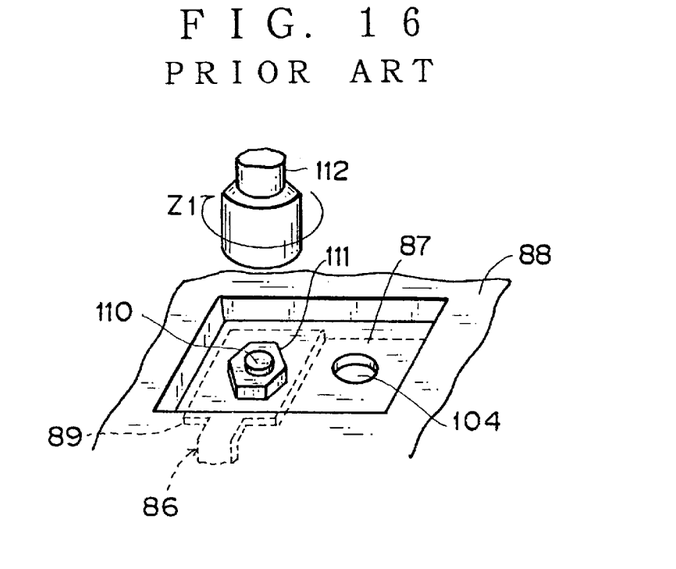
FIG. 16 is a perspective view showing a state of tightly-connecting the electric terminal and the busbar of FIG. 13 to an electrode of a battery.

With respect to the above a conventional structure, however, as shown in FIG. 16, when the electrically contacting portion 89 of the terminal 86 is tightened with the nut 111 the an arrow Z1 direction, big torque on the terminal 86 causes securing force of the terminal 86 to be weakened, whereby the terminal 86 slips off, gets rickety, and damages the plate body 88. Further, this gives bad influence on the electronic parts 107 (FIG. 14) connected to the middle portion of the terminal 86. If the small hole 106 (FIG. 14) is modified to a larger one to avoid the above drawback, cross-sectional area of the terminal 86 decreases, thereby increasing electric resistance of the terminal 86 and reducing mechanical strength thereof.

And, as shown in FIG. 13, though positioning of the busbar 87 can be done at the insert-molding thereof, positioning of the terminal 86 for voltage detection is difficult because the terminal 86 is narrow and long. Also, when the terminal 86 and the busbar 87 are set in the metal mold 102 or when the insert-molded product is taken out of the metal mold 102, there would be a danger that an operator touches the hot metal mold 102 and gets scalded, thereby bringing about bad workability and high manufacturing cost.

Further, in the battery connection plate 85 (FIG. 12), because at least two kinds of parts, namely the busbar 87 and the terminal 86 for voltage detection, are insert-molded at the same time, a lot of man-days is required for a preparation stage of the insert-molding, and simultaneously works are complicated because of many kinds of and a number of number of parts.

Figure 17:
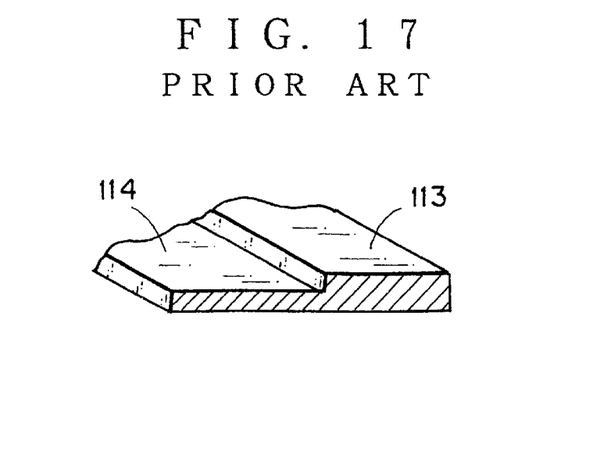
FIG. 17 is a perspective view showing an electric terminal integrally formed with a busbar with the same metal material.

If the terminal 86 for voltage detection and the busbar 87 are integrated so as to reduce the number of parts, heat radiation and electric resistance varies according to the shape because the busbar 87 acts to radiate heat from the battery. Because range for electric wires connectable to the terminal 86 for voltage detection depends on material and shape of the terminal 86, it has been difficult to integrate the terminal 86 with the busbar 87. In case that the same material is used, a terminal 114 for voltage detection has to be thinner than a busbar 113 form viewpoint of heat radiation and electric resistance, as shown in FIG. 17, which causes high cost.

Otherwise, in case that the terminal 86 is insert-molded in the plate body 88 after the electric wire 90 (FIG. 12) is pressure-welded to the terminal 86, positioning of the terminal 86 is difficult because a plurality of electric wires 90 get tangled, thereby causing bad workability of the insert-molding.

SUMMARY OF THE INVENTION

In view of the foregoing, an object of the present invention is to provide a battery connection plate and a manufacturing method therefor wherein securing force of a terminal being integrally insert-molded in a plate body made of moldable and insulative material such as synthetic resin is strengthened, workability of positioning the terminal at the insert-molding is enhanced, and further workability of the insert-molding is also enhanced by preventing electric wires from becoming tangled at the insert-molding.

In order to achieve the above-described object, as a first aspect of the present invention, a battery connection plate comprises: a plate body to be insulative and moldable; and a terminal to be insert-molded in the plate body and to be screw-connected to an electrode of a battery, wherein the terminal is provided with a hole portion and a projecting portion having an opening, the opening communicating with the hole portion and being directed to a screw tightening direction of the electrode.

As a second aspect of the present invention, a battery connection plate comprises: a plate body to be insulative and moldable; and a terminal to be insert-molded in the plate body and to be screw-connected to an electrode of a battery, wherein the plate body is provided with a pin portion and projections formed on both sides of the pin portion, the terminal is provided with a through hole to put the pin portion therethrough, and the projections are arranged on both sides of the terminal, and wherein the terminal is secured to the plate body by melting and transforming both of the pin portion and the projections.

As a third aspect of the present invention, a manufacturing method of insert-molding a terminal in a moldable insulative battery connection plate comprises the steps of: forming a pin portion and projections on both sides of the pin portion on the plate; forming a through hole to put the pin portion therethrough on the terminal; positioning the terminal between the projections; putting the pin portion through the through hole of the terminal; melting the pin portion and the projection; and securing the terminal to the plate body by transforming the pin portion and the projection.

As a fourth aspect of the present invention, a battery connection plate comprises: a plate body to be insulative and moldable; a terminal to be insert-molded in the plate body; and a busbar, formed integrally with the terminal and made of the same metal material as the terminal, to be insert-molded in the plate body, wherein the busbar is formed by double-folding back the metal material.

As a fifth aspect of the present invention, in the structure with the above fourth aspect, the terminal is connected to the busbar with a narrow portion.

As a sixth aspect of the present invention, a battery connection plate comprises: a plate body to be insulative and moldable; a terminal to be insert-molded in the plate body; an electric wire to be connected to the terminal; a pair of guide walls provided on the plate body and each having an insertion-fixing portion to hold the electric wire; and a groove portion formed between the pair of guide walls for arranging the electric wire therein.

As a seventh aspect of the present invention, in the structure with the above sixth aspect, the insertion-fixing portion is of a slit.

According to the above-described structure of the present invention, the following advantages are provided.

(1) When the terminal having the through hole receiving the male-threaded electrode of a battery is tightened with a nut, because the opening of the projecting portion of the terminal faces the tightening direction of the nut so that the opening of the projecting portion brings about big resistance against a tightening torque acting on the terminal, turning of the terminal can be securely checked, whereby securing force of the terminal is strengthened, damage of the plate body due to position change and backrush of the terminal can be prevented, and bad influence such as external force to an electron parts such as the circuit protection element mounted at a middle portion of the terminal cab be prevented. And, because the hole portion communicating with the opening can be small, decrease of a cross section area of the terminal can be limited to the minimum, increase of the electric resistance and deterioration of the mechanical strength can be prevented.

(2) The terminal is accurately positioned by means of the pin portion, and also the terminal can be tightly secured by melting the projection and the pin portion and transforming them. And, because the narrow and long terminal is accurately positioned and is insert-molded, both of the electronic parts to be mounted on the middle portion of the terminal and the wire connecting portion can be accurately positioned, thereby improving quality of the product. Further, because the terminal is tightly secured, turning of the terminal in tightening the electrode of the battery can be prevented.

(3) Because the terminal is set on the plate body, there is no danger of an operator to touch the hot metal mold, workability can be improved and manufacturing cost can be reduced.

(4) Because the busbar-integrated terminal is insert-molded, working man-day can be reduced. And, the busbar is formed thicker than the terminal body by double-folding back a metal plate, electric characteristic and heat radiation characteristic of both of the busbar and the terminal body can be improved, thereby facilitating the manufacture and simultaneously reducing parts cost.

(5) Because the heat is hard to transmit toward the busbar by means of the narrow portion when the electronic parts is soldered to the terminal body, soldering efficiency can be improved. On the contrary, because the heat is hard to transmit toward the terminal body from the busbar, i. e. from the battery, bad influence to the electronic parts mounted on the terminal body can be prevented.

(6) Because the electric wire is held provisionally by means of the insertion-fixing portion of the guide wall, the pressure-welding work of the electric wire to the terminal can be facilitated and secured. And, because the electric wire, to which the terminal is connected, is fixed to the insertion-fixing portion of the guide wall, a tangle of the electric wires can be prevented, thereby facilitating arrangement of the electric wires. Further, because a plurality of electric wires can be arranged in the groove portion between the guide walls, arranging work of the electric wires can be facilitated.

(7) Because the electric wire is put in the slit, the electric wire can be held securely.

The above and other objects and features of the present invention will become more apparent from the following description taken in conjunction with the accompanying drawings.

DESCRIPTION OF THE PREFERRED EMBODIMENTS

Embodiments of the present invention will now be described in further detail with reference to the accompanying drawings.

Figure 1:
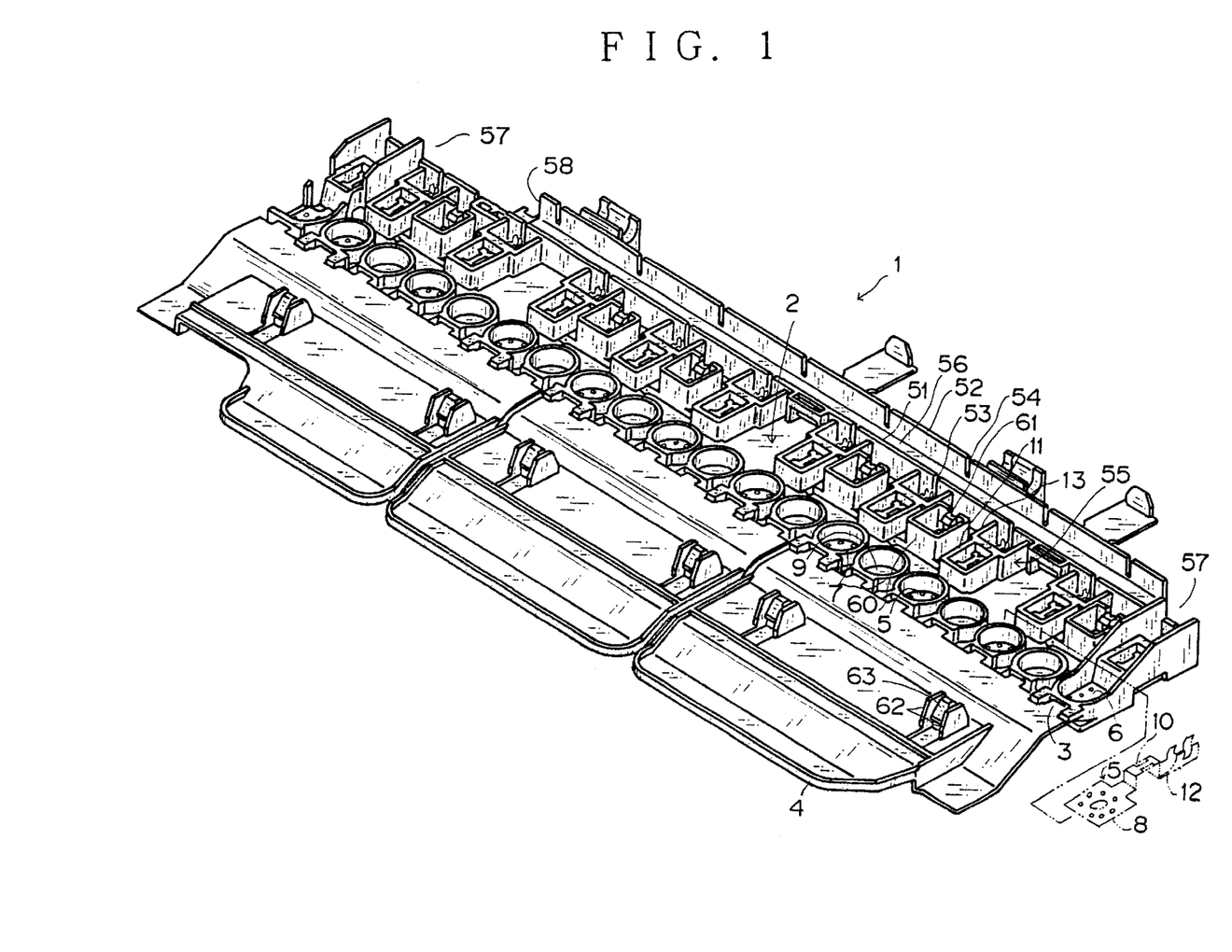
FIG. 1 is a perspective view showing an embodiment of a battery connection plate in accordance with the present invention.

FIG. 1 shows an embodiment of a battery connection plate in accordance with the present invention.

This battery connection plate 1 has a plate body 2 of synthetic resin, i. e. of insulative, and a cover 4 pivotably provided on the plate body 2 through a hinge 3. A busbar 9, an electric terminal 5 for voltage detection, and an electric terminal 6 for power feeding, i. e. a feeding terminal, are integrally provided on the plate body 2 by means of the insert-molding.

One piece of the busbar 9 is arranged under two neighboring circular holes 7 of the plate body 2, an electrically contacting portion 8 of the terminal 5 for voltage detection is arranged in one of the two circular holes 7, and the busbar 9 and the electrically contacting portion 8 surface-contacts to each other. An electronic parts mounting portion 10 located at a longitudinal middle portion of the terminal 5 is positioned inside a four-sided framed portion 11, and a wire connecting portion 12 of the terminal 5 is positioned inside a rear framed portion 13 continuing from the framed portion 11. Feeding terminals 6 in the same shape as the terminal 5 are insert-molded in the plate body 2 at the both ends thereof.

Figure 2:
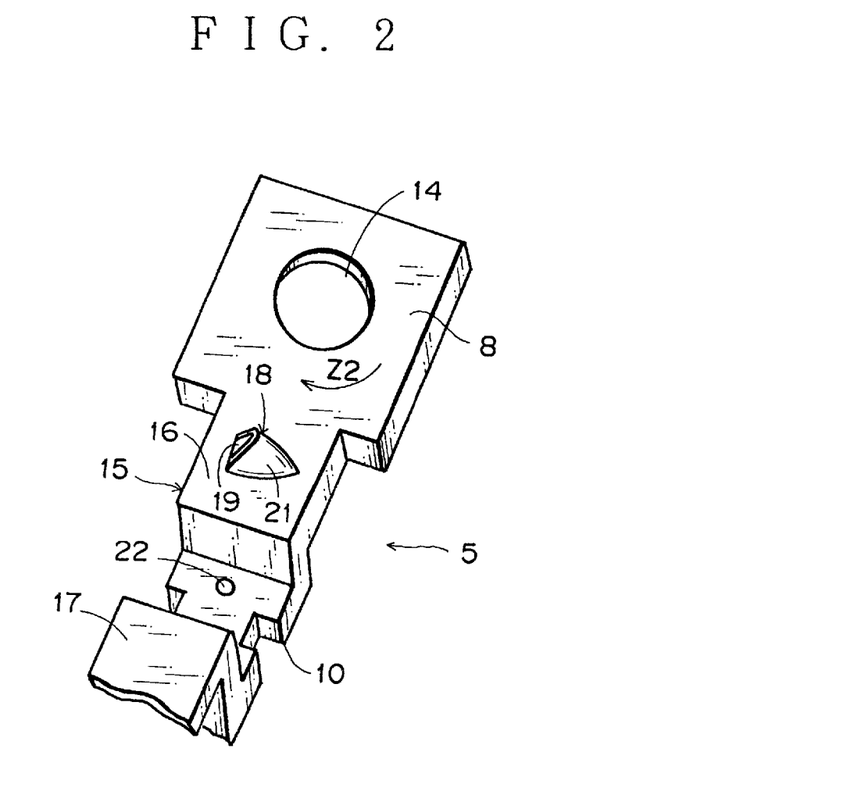
FIG. 2 is a perspective view showing an embodiment of a securing structure of an electric terminal used in the battery connection plate.

As shown in FIG. 2, the terminal 5 for voltage detection consists of the electrically contacting portion 8 having a through hole 14 for a male-threaded electrode (not illustrated) of a battery (not illustrated), a base plate portion 15 bendingly extending form the electrically contacting portion 8, and a wire connecting portion (not illustrated) continuing behind from the base plate portion 15. Here, small holes around the through hole 14 are omitted in FIG. 2. The base plate portion 15 consists of a front portion 16 continuing from the electrically contacting portion 8, the electronic parts mounting portion 10 being the intermediate portion, and a rear portion 17 continuing from the electronic parts mounting portion 10.

A projecting portion 18 as a whirl-stop is scratched up on the front portion 16 of the base plate portion 15. This projecting portion (or a scratched-up portion) 18 is a first feature in the present embodiment. The projecting portion 18 is formed in a tetrahedron-like shape and consists of two triangular wall portions 21 and a triangular opening 19 facing in a tightening direction (i. e. an arrow Z2 direction) of the terminal 5. The opening 19 communicates with a small hole (a hole portion) 20 (FIG. 3) on the base plate portion 15. 22 in FIG. 2 is a small hole to receive a lead terminal of electronic parts (not illustrated).

Figure 3:
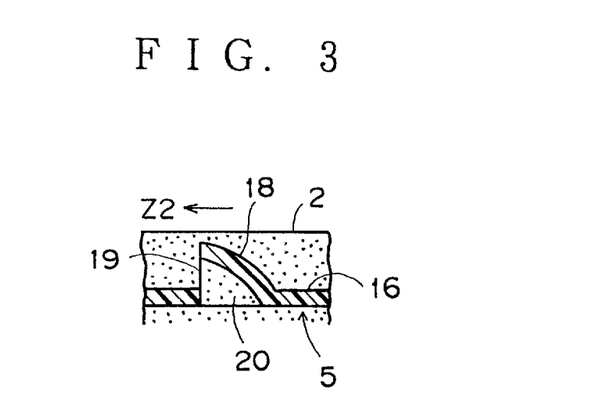
FIG. 3 is a sectional view showing the terminal securing structure of FIG. 2.

As shown in FIG. 3, upon insert-molding of the terminal 5 in the plate body 2 made of resin, the melted resin is filled up inside both of the small hole 20 and the projecting portion 18. After the resin has hardened, the male-threaded electrode of the battery (not illustrated) is put through the through hole 14 (FIG. 2) of the terminal 5 and is tightened with a nut (not illustrated). At this time, though the terminal 5 receives a torque in the arrow Z2 direction, because the opening 19 of the projecting portion 18 stands against the resin with a large area, the terminal 5 is prevented from turning, thereby preventing loosening or backrush of the terminal 5. That is, because the resin is filled up inside the projecting portion 18 from the opening 19 to the small hole 20, securing force of the terminal 5 is enhanced.

Here, another projecting portion 18 may be formed in the rear portion 17 of the base plate portion 15 (FIG. 2). In case that an electronic part such as a circuit protection element is connected to the intermediate portion 10, however, the projecting portion on the rear portion 17 is unnecessary because the intermediate portion 10 is cut off later. In this case, the rear portion 17 can be secured enough by means of the insert-molding. The tightening torque can be sustained by the projecting portion 18 of the front portion 16, and excessive external force on the electronic parts can be prevented.

The projecting portion 18 can also be applied to the feeding terminal 6 (FIG. 1) and further to the terminal of the conventional battery connection plate (FIG. 12).

Figure 4:
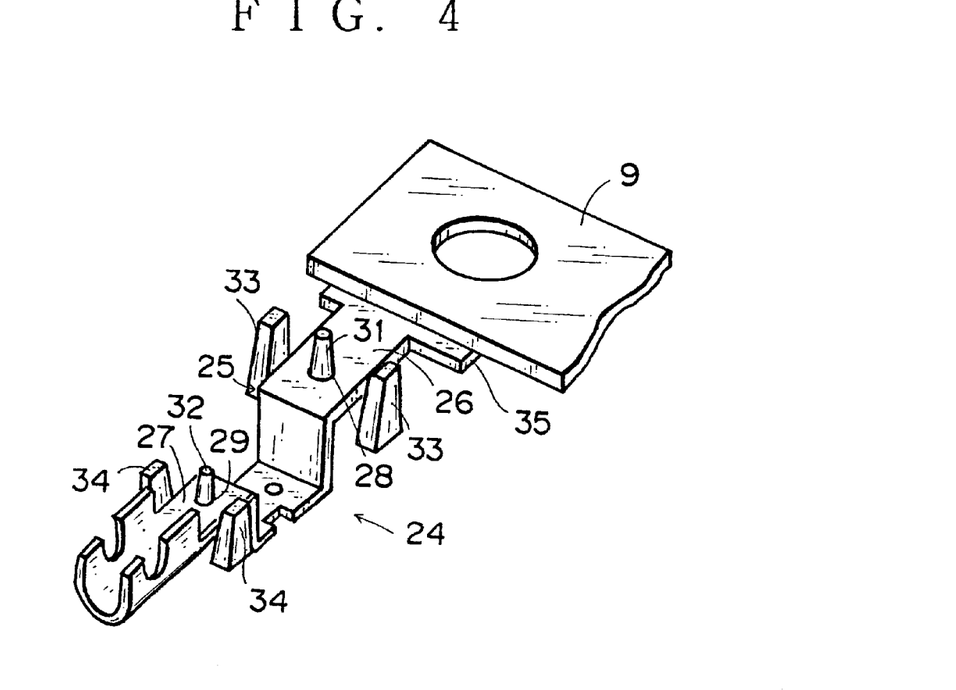
FIG. 4 is a perspective view showing another embodiment of a terminal securing structure.
Figure 5:
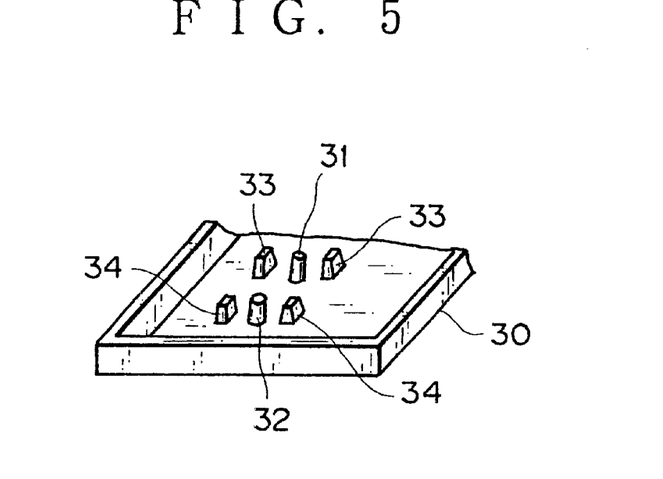
FIG. 5 is a perspective view showing the terminal securing structure of the battery connection plate of FIG. 4.
Figure 6:
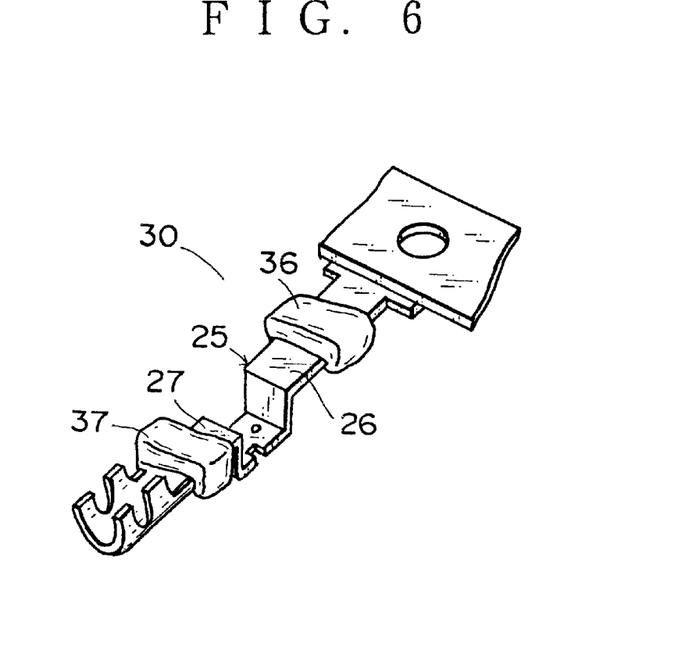
FIG. 6 is a perspective view showing a state wherein the electric terminal of FIG. 4 is secured.

FIGS. 4–6 show another embodiment of a securing structure of a terminal for voltage detection or of a feeding terminal; namely, show an example of a manufacturing method of a battery connection plate. Referring to FIG. 4, a pair of small holes (through holes) 28, 29 are provided on a front portion 26 and on a rear portion 27 of a base plate portion 25, and pin portions 31, 32 of a plate 30 of resin are inserted into each of the small holes 28, 29 while completing setting of a terminal 24. Position of the terminal 24 is decided accurately by two pairs of pin portions 31, 32.

The pin portions 31, 32 are formed sufficiently longer than a thickness of the base plate portion 25, and the ends of the pin portions 31, 32 projects high over the base plate portion 25. A pair of block-like projections 33, 34 are provided on both sides of each of the pin portions 31, 32. The projections 33, 34 are arranged closely to both edges of the base plate portion 25. Length of the projections 33, 34 is set almost equally to a length of the pin portions 31, 32.

As shown in FIG. 5, the projections 33, 34 and the pin portions 31, 32 are integrally formed with a plate 30 of resin. This plate 30 is, for example, set inside a recess of a metal mold (not illustrated) and forms a part of the plate body (reference numeral 2 of FIG. 1, for example).

As shown in FIG. 6, the projections 33, 34 and the pin portions 31, 32 of FIG. 4 melt with heat and cover a front portion 26 and a rear portion 27 of the base plate portion 25 of the terminal 24. That is, the projections 33, 34 and the pin portions 31, 32, are melted and connected. The base plate portion 25 is secured to the plate 30 by the projections 33, 34 and the pin portions 31, 32. The terminal 25 is secured to the plate 30 tightly by the resin members 36, 37, and a torque (the arrow Z2 direction in FIG. 2) arisen at tightening the electrode is sustained securely. According to the present embodiment, positioning and securing of the terminal 24 by means of the projections 33, 34 and of the pin portions 31, 32, member or material can be effectively use.

As a means to melt the projections 33, 34 and the pin portions 31, 32 after having set the terminal 24 in the plate 30 of FIG. 5, a method to push an upper heated metal mold (not illustrated) down to the projections 33, 34 and the pin portions 31, 32 or another method to apply the laser beam and the supersonic wave, which are not illustrated, to the projections 33, 34 and to the pin portions 31, 32 are effective.

Because these heating methods do not require a lower metal mold, which supports the terminal 24, to be heated, there is no worry about an operator to get scalded by touching the metal mold, thereby making work easier and promoting cost saving. The structures of FIGS. 4–6 are effective as a terminal securing method.

The busbar 9 is set on the electrically contacting portion 35 of the terminal 24 of FIG. 4, and the busbar 9 is insert-molded in the plate body 30 along with the electrically contacting portion 35. The electrically contacting portion 35 of the terminal 24 can be formed integrally with the busbar 9 with the same metal material. This will be described with the following embodiment.

Figure 7:
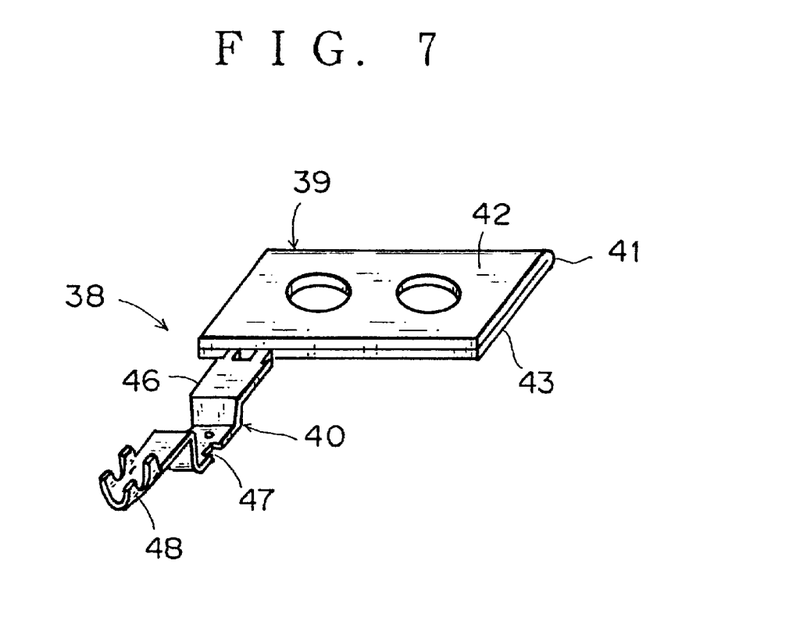
FIG. 7 is a perspective view showing an embodiment of a busbar-integrated terminal.
Figure 8:
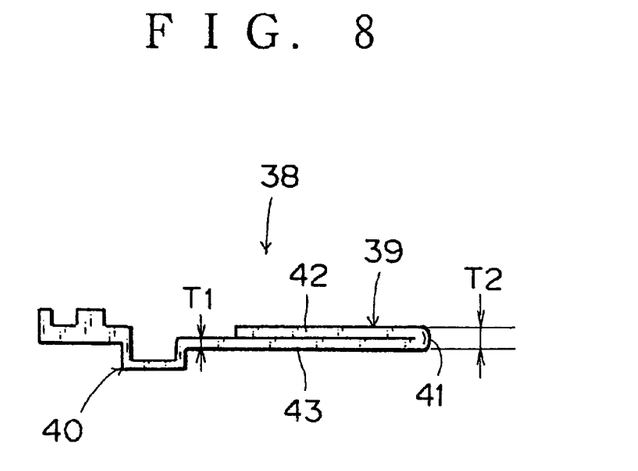
FIG. 8 is a side view showing the busbar-integrated terminal of FIG. 7.
Figure 9:
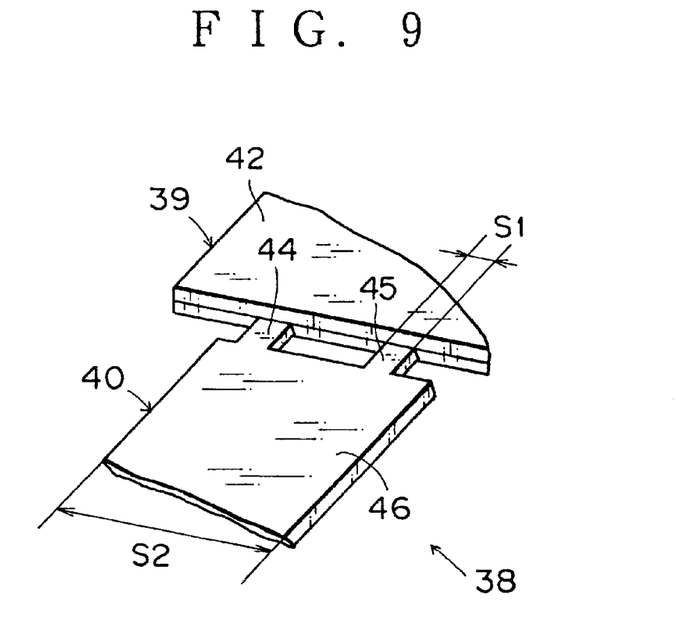
FIG. 9 is an enlarged perspective view showing a connecting portion between the busbar and a terminal body of the busbar-integrated terminal of FIG. 7.

FIGS. 7–9 show another embodiment of a terminal for voltage detection.

In this terminal 38, as shown in FIGS. 7–8, a busbar 39 and a terminal body 40 are made of the same metal with the same thickness. The busbar 39 is made of a metal plate having a turn-up portion 41 at the front end, and the front edge of the terminal body 40 is integrally connected to the rear end of an upper board portion 42 or of a lower board portion 43 of the busbar 39.

Because the busbar 39 has a double thickness T2 of the terminal body 40 having a thickness T1 (FIG. 8), the electric resistance or the heat radiation of each of the busbar 39 and the terminal body 40 can be suitably controlled in spite of using the same metal material. The terminal body 40 can have an appropriate thickness meeting a diameter of an electric wire to be connected thereto. Because the terminal 38 can be formed with the simple way of folding back the busbar 39 in two pieces, parts cost can be reduced in comparison with the conventional terminal (FIG. 17) formed with a board with a step.

As shown in FIG. 9, the terminal- body 40 is connected to the busbar 39 with a right and left pair of narrow portions 44, 45. A width S1 of the narrow portions 44, 45 should be about ¼ of a width S2 of a base plate portion 46 of the terminal body 40. The terminal 38 can be set stable in the metal mold (not illustrated) for the insert-molding with this structure. After having insert-molded the terminal 38, one of the narrow portions 45 can be cut off to reduce a cross section of the connecting portion, whereby wettability of the solder to be applied to connect an electronic part (not illustrated) to a middle portion 47 (FIG. 7) of the base plate portion 46 of the terminal body 40 is improved.

That is, the heat gets hard to escape toward the busbar 39 side through the narrow portion 44, thereby promoting heating-up of the base plate portion 46 (i. e. the middle portion 47). Reversely, even if the busbar 39 gets hot with the heat from the battery, because the heat is hard to transmit to the terminal body 40 due to the narrow portion 44, the electronic parts does not suffer bad influence from the heat.

Even if the pair of narrow portions 44, 45 are just used without cutting off the narrow portion 45, the above effect can be expected. And, the narrow portions 44, 45 of the terminal body 40 can be connected to the upper board portion 42 of the busbar 39. Also, the base plate portion 46 of the terminal body 40 can be provided with the securing means and the positioning means applied to the previous embodiment (FIG. 2 and FIG. 4).

In the present embodiment, however, because the busbar 39 is integrally formed with the terminal body 40, the busbar 39 fully sustains the tightening torque of the electrode of the battery (not illustrated), and therefore a torque does not act on the terminal body 40 only by insert-molding the busbar 39 in a plate body of resin (reference numeral 2 of FIG. 1, for example). Because position of the terminal body 40 is decided according to the position of the busbar 39, the terminal body 40 needs not to be positioned. However, in case that the narrow portions 44, 45 have been transformed and position of the terminal body 40 deflects, the above positioning means is effective.

The terminal body 40 (FIG. 7) includes a base plate portion 46 and a wire connecting portion 48 similarly to the above embodiment. And, the base plate portion 46 is made up of a front portion, an intermediate portion 47 on which an electronic parts is to be mounted, and a rear portion on a side of the wire connecting portion 48. A signal line (not illustrated) is pressure-welded to the wire connecting portion 48.

In the embodiment of the battery connection plate 1 of FIG. 1, the signal line 50 (FIG. 10) and the power feeder (not illustrated) arranged on both sides of or on a side of the battery connection plate 1 are held in guide walls 51, 52 of the battery connection plate 1. The signal line (an electric wire) 50 and the power feeder are inserted into slits 53, 54 and provisionally held therein, and at that state of FIG. 10, end portions of the respective electric wires are pressure-welded to the wire connecting portions 12 of the terminals 5, 6. The busbar 9 and the terminal 5 have been already insert-molded. The electric wires having been provisionally held by the slits 53, 54 are returned to the original positions after the pressure-welding of the respective terminals. This structure is effective as a wiring method in the battery connection plate 1.

The guide walls 51, 52 are arranged oppositely to each other at a wire leading-out side of the plate body 2. The front guide wall 51 extends in a longitudinal direction of the plate body 2 orthogonally to the framed portion 13 positioned at the back of the terminal accommodating portion 55 (FIG. 1) of the plate body 2, and the rear guide wall 52 stands at the rear end of the plate body 2 in parallel with the front guide wall 51, while forming a groove (a groove portion 56) to arrange a plurality of electric wires between the walls 51, 52. Here, the front and the back of the plate body 2 correspond to those of the terminal 5. The terminal accommodating portion 55 has at least the front circular hole 7, the middle framed portion 11, and the rear framed portion 13. The front guide wall 51 extends over a full length of the plate body 2, and the rear guide wall 52 is shorter than the front guide wall 51 by at least a length required for a space portion 57 provided at both rear sides of the feeding terminals 6.

Figure 10:
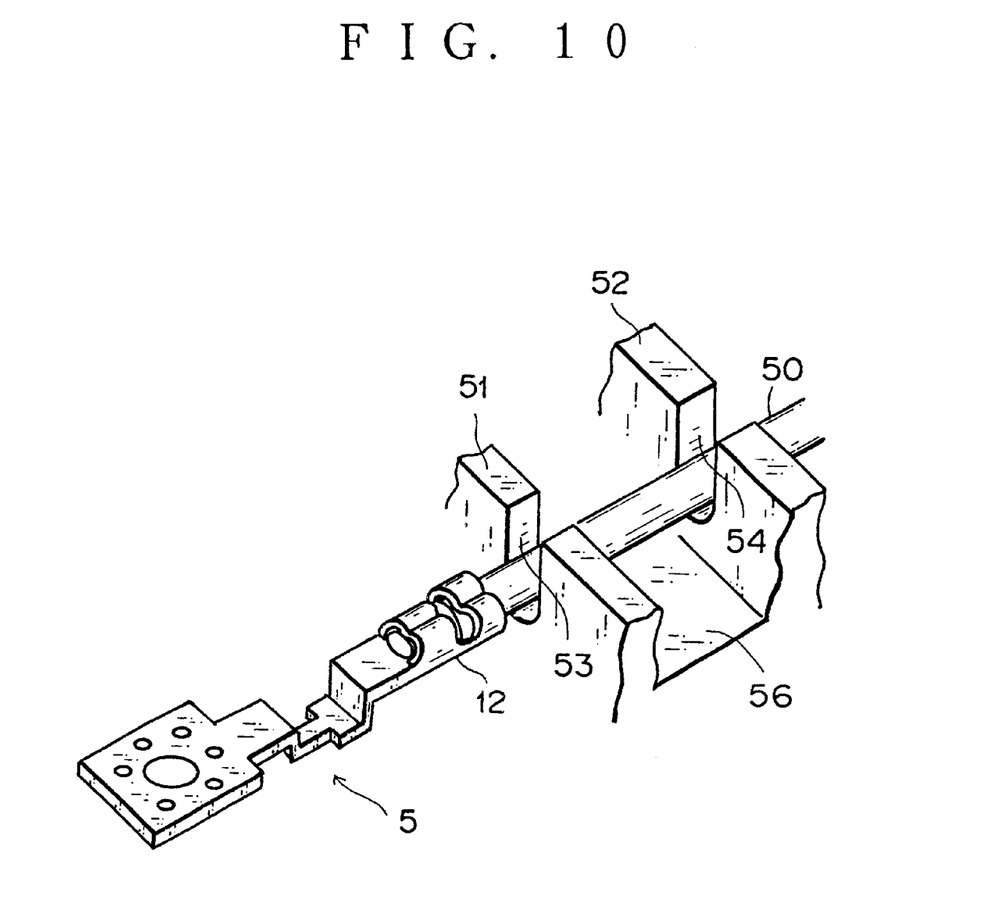
FIG. 10 is a perspective view showing a holding structure of an electric wire connected to the battery connection plate of FIG. 1.

Wire-inserting slits (i. e. an insertion-fixing portion) 53, 54 are formed vertically on the guide walls 51, 52 behind the terminals 5, 6. The slits 53, 54 are arranged in a line. Slits 53, 54 each are arranged with a determined interval on the respective guide walls 51, 52. Width of the slits 53, 54 is almost equal to or a little smaller than the outside diameter of the electric wire 50 so that the electric wire 50 is tightly put between each of the slits 53, 54, thereby facilitating pressure-welding work of the electric wire 50 to each of the terminals 5, 6. When the terminals 5, 6, to which the electric wires 50 are pressure-welded, are insert-molded, because the electric wires 50 are held, position change of the terminals 5, 6 can be prevented, thereby facilitating the insert-molding of the terminals 5, 6. Because the electric wires 50 are arranged with a determined interval according to the slits 53, 54, a tangle of the electric wires 50 can be prevented and also arranging work of the electric wires 50 is facilitated.

After the pressure-welding of the terminal, the electric wire 50 is removed only from the slit 54 of the guide wall 52, is arranged in a longitudinal direction of the plate body 2 through the groove portion 56 between the guide walls 51, 52, and is led out from the opening 58 of the groove portion 56. The electric wires 50 can be gathered up in the same leading-out direction, whereby the plate body can be in good order. Because each of electric wires 50 is held by the slit 53 of the guide wall 51, bending work of the electric wire 50 in a right angle is easy. For example, a notch in a V-shape (not illustrated) can be formed in place of each of the slits 53, 54.

As shown in FIG. 1, a framed portion 60 for engaging the cover 4 is formed adjacently to the terminal accommodating portion 55, and an engaging projection 61 is provided inside the framed portion 60. The battery connection plate 1 is provided with three covers 4. In a middle portion of a depth direction of each of the cover 4, a pair of guide walls 62 to engage the framed portion 60 and an engaging projection 63 positioned between both of the guide walls 62 are formed. Upon closing the cover 4, the terminal accommodating portion 55 and the groove portion 56 which is an electric wire accommodating portion are blocked so that the terminals 5, 6, the busbar 9, the electric wire 50, and the electrode of the battery (not illustrated) are protected.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A battery connection plate, comprising:

an insulative and moldable plate body;

a terminal having a wire connecting portion and arranged for insert-molding in the plate body;

a busbar, formed integrally with the terminal, at an opposite side of the wire connecting portion, and made of the same metal material as the terminal, arranged for insert-molding in the plate body, wherein the busbar is formed by double-folding back the metal material, at a front end thereof, to form an upper board portion and a lower board portion with rear ends thereof substantially aligned with each other, with the terminal attached to one of the rear ends of the upper board portion and the rear end of the lower board portion.

2. The battery connection plate as set forth in claim 1, wherein the terminal is connected to the busbar with a narrow portion.

3. The battery connection plate as set forth in claim 2, wherein the narrow portion has a width of about ¼ of a width of a base plate portion of the terminal.

* * * * *